United States Patent [19]

Thompson

[11] 4,130,602
[45] Dec. 19, 1978

[54] BLOCK COPOLYMER OF POLY(DIOXA-AMIDE) AND POLYAMIDE

[75] Inventor: Robert M. Thompson, Wilmington, Del.

[73] Assignee: Sun Ventures, Inc., Radnor, Pa.

[21] Appl. No.: 769,246

[22] Filed: Feb. 16, 1977

Related U.S. Application Data

[63] Continuation-in-part of Ser. No. 557,717, Mar. 12, 1975, abandoned, which is a continuation-in-part of Ser. No. 418,524, Nov. 14, 1973, abandoned.

[51] Int. Cl.² .................................................. C08L 77/00
[52] U.S. Cl. .................................................. 260/857 TW
[58] Field of Search ....................... 260/78 R, 857 TW

[56] References Cited

U.S. PATENT DOCUMENTS

| | | | |
|---|---|---|---|
| 2,339,237 | 1/1944 | Brubaker | 260/78 |
| 3,397,107 | 8/1968 | Kimura | 260/857 TW |
| 3,683,047 | 8/1972 | Honda | 260/857 TW |

FOREIGN PATENT DOCUMENTS

| | | |
|---|---|---|
| 822164 | 5/1975 | Belgium. |
| 562370 | 0000 | United Kingdom. |
| 574713 | 0000 | United Kingdom. |
| 615954 | 0000 | United Kingdom. |
| 1030344 | 0000 | United Kingdom. |
| 1304865 | 0000 | United Kingdom. |

*Primary Examiner*—Paul R. Michl
*Attorney, Agent, or Firm*—J. Edward Hess; Donald R. Johnson; Anthony Potts, Jr.

[57] ABSTRACT

Novel block copolymer formed by melt blending a melt spinnable polyamide such as nylon-6 and a poly(dioxa-amide) such as poly(4,7-dioxadecamethylene adipamide) which is also known as N-30203-6 is disclosed. Said copolymer has utility as a fiber. The fiber of disclosed copolymer, for example, of nylon-6 and said poly(dioxa-amide) has moisture absorption characteristics similar to that of cotton. Resulting copolymer is also known as N-30203-6//6. Furthermore, the resulting fiber still maintains the other desirable properties of the major constituent, for example, nylon-6.

47 Claims, No Drawings

BLOCK COPOLYMER OF POLY(DIOXA-AMIDE) AND POLYAMIDE

CROSS REFERENCE TO RELATED APPLICATIONS

This application is a continuation-in-part of U.S. patent application Ser. No. 557,717, filed Mar. 12, 1975, now abandoned, which in turn is a continuation-in-part of U.S. patent application Ser. No. 418,524, filed Nov. 14, 1973, now abandoned. The latter is related to U.S. application Ser. No. 415,582, filed Nov. 14, 1973 by Robert M. Thompson and Richard S. Stearns, title of the application is "Copolymer of Blocks of Alternating Poly(dioxa-amide) and Polyamide". Also related are U.S. applications Ser. Nos. 415,583 and 415,610, both filed Nov. 14, 1973 by present inventor and titled "Block Copolymer of Poly(oxa-amide)and Polyamide" and "Block Copolymer of Poly(dioxa-arylamide) and Polyamide", respectively. Also related is U.S. application Ser. No. 415,581, filed Nov. 14, 1973 by Elmer J. Hollstein. Subject matter of the latter application relates to a method for the hydrogenation of a dinitrile which is a precursor of the hydrophilic polymer disclosed within the aforementioned related applications.

BACKGROUND OF THE INVENTION

It is known that commercially important polyamides, such as nylon-6, have excellent physical properties in many respects. However, for certain textile application fabrics and similar products prepared from such nylons are somewhat deficient in moisture absorption as compared to a natural fiber such as cotton. This characteristic is important because according to ENCYCLOPEDIA OF POLYMER SCIENCE AND TECHNOLOGY, Vol. 10, Section Polyamide Fibers, moisture absorption determines comfort factors, ease and cost of dyeing, antistatic character and hand or feel of the fabric. To overcome this moisture absorption deficiency many attempts have been made but none have been commercially successful to date.

Disclosed herein is a novel block copolymer which can be converted into a fiber having moisture absorption properties superior to that of commercially used polyamide such as nylon-6. This block copolymer consists of a specified polyamide and a specified poly(dioxaamide). Surprisingly, the incorporation of a specified poly(dioxa-amide) into a specified polyamide does not adversely effect the many desirable fiber properties of the polyamide and, in fact, improvement in certain mechanical properties such as initial modulus and strength can be obtained. Furthermore, incorporation of said poly(dioxa-amide) materially improves its moisture absorption property. Also the copolymer can be formed into other desired shapes by extrusion, injection molding and other well-known thermoplastic forming methods.

A block copolymer can result when a mixture of polymer Z and polymer Y, both of which contain amides, is properly processed. Thus the resulting block copolymer contains relatively long chains of a particular chemical composition, the chains being separated by a polymer of different chemical composition; thus diagrammatically

| Z | Y | Z |
|---|---|---|

Another type of a block copolymer is one which contains relatively long chains of a particular chemical composition which are separated by a low molecular weight "coupling agent", thus diagrammatically

| Z | Y | Z |
|---|---|---|

Each of the aforementioned polymer chains, i.e., Z and/or Y, can be a homopolymer or a random copolymer.

Generally, copolymers containing an amide functional group, i.e.,

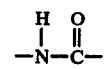

can be formed by melting two polyamides. Thus when two different polyamides are mixed and heated above their melting point copolymers are formed. This process is also known as melt blending. However, the length of time the polymers are maintained at a temperature above their melting points has a profound effect on the resulting structure. As the mixing at the elevated temperature begins the mass is a physical mixture of two different compounds. But gradually as the heating and mixing continues the mixture is converted into a copolymer characterized as a "block" copolymer. However, if the heating and mixing continues the length of the "blocks" decrease and sequences of "random" copolymers appear. If the heating and mixing occurs for a sufficient time most of the "blocks" disappear and mostly "random" sequences form as evidenced by deterioration of its physical properties including melting point. At present there is no known direct way of determining chain sequence of such a polymer. But indirect methods exist, such as melting points for example, and this is discussed in detail hereinafter. Controlled decomposition of such a copolymer will yield all identifiable components that make up the copolymer but will not indicate sequences.

Polymers, including copolymers, containing amide functional groups generally result from a reaction known as condensation. Condensation refers to a polymer-forming reaction in which water can be a by-product. The various types of polymers that can be produces from condensation (or step growth polymerization) are described hereinafter. The initial stage of a condensation polymerization consists of random combinations of two monomeric units to form dimer molecules. Examples of these could be the formation of two units of nylon-11 from the corresponding amino acid (11-aminoundecanoic acid) in the case of an AB polyamide

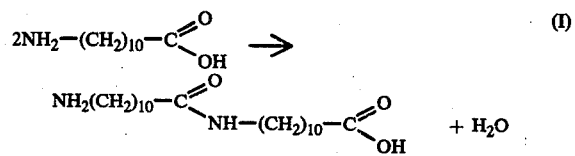

(I)

or adipic acid molecule and hexamethylene diamine in an AABB system

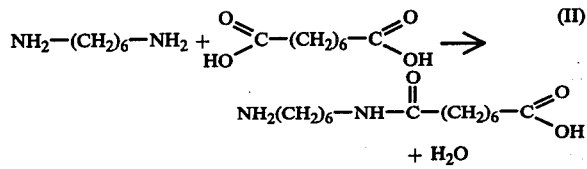

(II)

The letter "A" refers to one of the functional groups of the monomer, "B" refers to the other.

The foregoing dimer molecules will combine with equal facility with another monomeric unit or a dimer unit. In this fashion, the average degree of polymerization ($\overline{DB}$) builds during the course of the reaction. This is discussed in greater detail in ORGANIC CHEMISTRY OF SYNTHETIC HIGH POLYMERS, Robert W. Lenz, Library of Congress Catalog Card No. 66-22057.

In the same manner, as reactions I and II, random copolymers can be formed. The only condition necessary is that more than one type (or two if an AABB system is used) of monomer unit be present during the condensation reaction. Thus following from the example above where monomer of AB and AABB polymers are present in the same reactor at the beginning of the polymerization, the AB monomer (amino acid) will react with a similar unit or the AABB monomer unit (the diamine or diacid) in a random fashion since their reactivities are similar. The final result of such a polymerization will be a random copolymer. If their reactivities are very dissimilar, there would be a tendency to become blocks, however, units having similar carboxylic and/or similar amine ends have similar reactivities. Further examples of random copolymers are given in U.S. Pat. No. 3,397,107 where the monomer units of N-303/T and caprolactam are polymerized in a random fashion. Another example is contained in U.S. Pat. No. 3,594,266 in which a polyethylene oxide diamine, terephthalic acid and caprolactam were polymerized in a random fashion. Since the condensation polymerization is a random sequence of events it would be extremely improbable to obtain an alternating copolymer using dissimilar monomer units in the condensation reaction as it is known today. An alternating copolymer can be classified as a special type of random copolymer.

Formation of a condensation block copolymer cannot be easily achieved using the conditions described heretofore because of the random reaction of monomeric units. Block copolymer preparations have been described in the patent literature using at least two techniques. One technique, as described before, is melt blending two homopolymers at temperatures where the polyamide becomes reactive to amide interchange, chain extension and hydrolysis. Such a technique is disclosed in U.S. Pat. No. 3,393,252. When the conditions are closely controlled block copolymers with a distribution of optimum sequence lengths can be prepared.

Another method of preparing block copolymers is described in U.S. Pat. No. 3,683,047. It consists of polymerizing two homoprepolymers of low molecular weight such as from 1000 to 4000. In this specific case, one prepolymer was carboxyl terminated while the other was amine terminated. The result of the polymerization is a block copolymer. Under the conditions of polymerization very little randomization occurred as indicated by little loss in melting point during the blend time. These block copolymers have been called ordered copolymers since by the nature of the starting materials reactive functional groups they cannot react with themselves.

Other examples of random copolymers are as follows. CHEMICAL ABSTRACT 88764f, Vol. 70, 1969, (Japanese Pat. No. 28,837/68) discloses a random copolymer having moisture retention properties prepared from the combination of (a) salt of bis($\alpha$-aminopropoxy)-ethane (also referred to as 30203) and adipic acid and (b) the monomer caprolactam. British Pat. No. 1,169,276 discloses a random copolymer having improved hydrophilic properties prepared from the combination of (a) salt (I) of $H_2N(CH_2)_3$—O—$CH_2$—$C(CH_3)_2$—$CH_2$—O—$(CH_2)_3NH_2$ and adipic acid and (b) the monomer caprolactam; also a random copolymer of the aforementioned salt (I) and hexamethylene diammonium adipate $(H_3{}^+N(CH_2)_6NHCO(CH_2)_4COO)^-$; also referred to as nylon-6,6 salt. CHEMICAL ABSTRACT 4514h, Vol. 49, 1955, discloses a random copolymer prepared from the (a) salt (II) of $H_2N(CH_2)_3$—O—$(CH_2)_4$—O—$(CH_2)_3$—$NH_2$ and adipic acid and (b) nylon-6,6 salt. Salt (II) upon heating forms a cream-colored material; such discoloration detracts from its utility where clarity is required. U.S. Pat. No. 3,522,329 discloses a random copolymer prepared from the (a) salt of diamine of polyethylene oxide ($HOCH_2CH_2(O$—$CH_2CH_2)_nOH$) and adipic acid and (b) $\epsilon$-caprolactam (also called caprolactam). U.S. Pat. No. 3,514,498 discloses a random copolymer prepared from the (a) salt of diamine of polyethylene oxide and adipic acid and (b) $\epsilon$-caprolactam.

Examples of block copolymers are as follows. The previously mentioned U.S. Pat. No. 3,514,498 also disclosed a block (random) copolymer prepared from two polymers; (a) polymer resulting from the salt of diamine of polyethylene oxide and adipic acid and $\epsilon$-caprolactam and (b) poly-$\epsilon$-capramide (nylon-6). U.S. Pat. No. 3,549,724 also discloses a block (random) copolymer prepared from (a) polymer prepared from polyethylene oxide diammonium adipate and $\epsilon$-caprolactam and (b) nylon-6 or nylon-6,6. U.S. Pat. No. 3,160,677 discloses a block copolymer prepared from (a) a polymer prepared from dibutyloxalate [$(COOC_4H_9)_2$] and a diamine and (b) polycaprolactam.

Because of the complexity in naming the copolymers of polyamide and poly(dioxa-amide), a shorthand nomenclature is used herein. It is based in part on the nomenclature used to identify aliphatic polyamides. Numbers signifies the number of carbon atoms in a polymer. The letter "O" signifies oxygen and its relative location within the polymer; "N" signifies polyamide linkage; "T" signifies terephthalic. Thus "30203" refers to a diamine function while "6" refers to the diacid function. Therefore, "6" refers to six carbon paraffinic diacid and in particular adipic acid. Also "30203" indicates the number of paraffinic carbons and the "O" indicates the placement of oxygen. In this nomenclature a slash (/) designates a random copolymer whereas a double slash (//) indicates a block copolymer. Thus N-30203-6//6 indicates that blocks of N-30203-6 are connected within the copolymer with blocks of "6" (nylon-6).

Contrary to expectations based on the previously discussed art it has now been found that it is possible to prepare a composition comprising a block copolymer of polyamide and poly(dioxa-amide) having moisture uptake equivalent to that of cotton. In addition fibers of the copolymer have overall fiber properties substantially equivalent to that of such nylons as nylon-6.

SUMMARY OF THE INVENTION

Present invention resides in a novel composition. It has utility as a fiber as well as other utilities. The composition is a block copolymer of a specified polyamide and a specified poly(dioxa-amide). The polyamide portion of the molecule is a bivalent radical of a melt spinnable polyamide having no ether linkages. The poly(dioxa-amide) portion of this molecule contains both a double oxygen linkage, i.e., —R—O—R—O—R— and amide linkage, i.e.,

The following repeating structural formula depicts the composition of this invention:

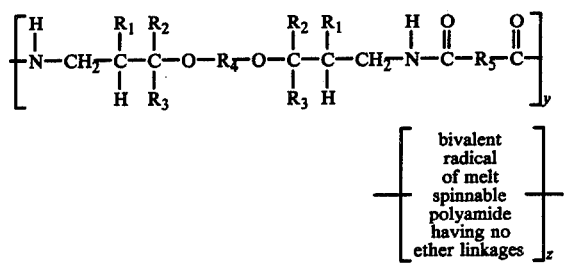

wherein $R_1$, $R_2$ and $R_3$ are selected from the group consisting of H, $C_1$–$C_{10}$ alkyls and $C_3$–$C_{10}$ isoalkyls; $R_4$ is selected from the group consisting of $C_1$–$C_{10}$ alkylenes and $C_3$–$C_{10}$ isoalkylenes; $R_5$ is selected from the group consisting of $C_0$–$C_{10}$ alkylenes and $C_3$–$C_{10}$ isoalkylenes; and y = 4–200 and z = 4–300. The molecular weight of the copolymer is about 5000–100,000.

DESCRIPTION

As stated heretofore one portion of the novel composition is a melt spinnable polymer having no ether linkages. Melt spinnable refers to a process wherein the polymer, a polyamide, is heated to above its melting temperature and while molten forced through a spinneret. The latter is a plate containing from one to many thousands of orifices, through which the molten polymer is forced under pressure. The molten polymer is a continuous filament and depending on the number of orifices many filaments can be formed at the same time.

The molten filaments are cooled, solidified, converged and finally collected on a bobbin. This technique is described in greater detail in ENCYCLOPEDIA OF POLYMER SCIENCE AND TECHNOLOGY, Vol. 8, Man-Made Fibers, Manufacture.

If a single fiber is extruded, as in the case when it is intended to be knitted into hosiery, the product is called a monofilament. When the product is expected to be converted into a fabric by knitting or weaving, the number of monofilaments is in the range of 10–100. Such a product is known as a multifilament yarn. Yarns for industrial application, such as in the construction of tire cords, usually contain several hundred to a thousand or more filaments. When the fibers are used to make a spun yarn, i.e., a yarn formed by twisting short lengths of fibers together, as is the practice with cotton, the number of orifices can rise to tens of thousands. The extruded material is cut into pieces in the range of 1–5 inches long to produce "staple" fiber. This stable fiber is converted into spun yarn in the same manner as cotton. Polymer of present invention can be prepared into the aforementioned forms by the various methods disclosed.

Also, the polymers of present invention can be used to prepare nonwovens. Nonwoven refers to a material used as a fabric made without weaving, and in particular having textile fibers bonded or laminated together by adhesive resin, rubber or plastic or felted together under pressure. Many such methods are described in detail in MANUAL OF NONWOVENS, Prof. Depling and Dr. Radko Krema, Textile Trade Press, Manchester, England.

Polyamides which are crystallizable and have at least a 30° C. difference between melting point and the temperature at which the molten polymer undergoes decomposition can be melt spun. Examples of melt spinnable polyamides having no ether linkages are as follows: nylon-6,10 [poly(hexamethylene sebacamide)]; nylon-6 [poly-(pentamethylene carbonamide)]; nylon-6,6 (hexamethylene adipamide); nylon-11 [poly(decamethylene carbonamide)]; MXD-6 [poly(meta-xylene adipamide)]; PACM-9 [bis(para-aminocyclohexyl)-methane azelamide]; PACM-10 [bis(para-aminocyclohexyl)methane sebacamide]; and PACM-12 [bis(para-aminocyclohexyl)methane dodecanoamide]. Others are listed in ENCYCLOPEDIA OF POLYMER SCIENCE AND TECHNOLOGY, Vol. 10, Section Polyamide Fibers, table 12. Methods for preparing these polyamides are well known and described in numerous patents and trade journals.

The poly(dioxa-amide) portion of the composition can be prepared by the following generalized scheme:

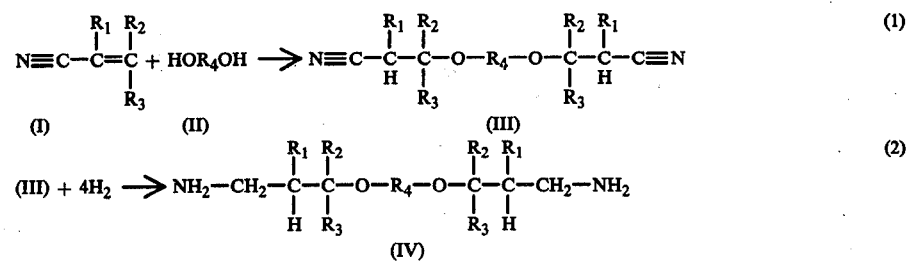

(IV) + HOOCR₅COOH → 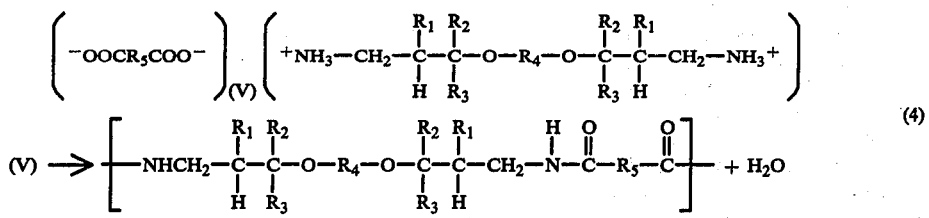

(3)

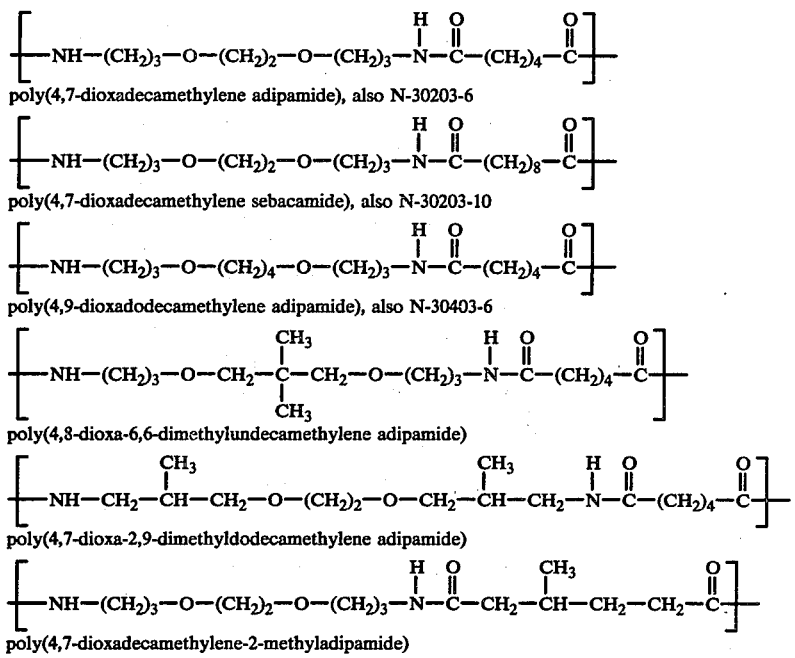

Reaction (1) is often referred to as cyanoethylation; particularly wherein $R_1$, $R_2$ and $R_3$ = H; also these R's can be $C_1$–$C_{10}$ alkyls or $C_3$–$C_{10}$ isoalkyls. $R_4$ can be one of the following: $C_1$–$C_{10}$ alkylene and $C_3$–$C_{10}$ isoalkylene. Reaction (2) is a hydrogenation. Reaction (3) is the reaction between a diacid and diamine resulting in a salt. $R_5$ can be one of the following: $C_0$–$C_{10}$ alkylene and $C_3$–$C_{10}$ isoalkylene. Reaction (4) is often referred to as a condensation polymerization. Here the repeating unit contains fewer atoms than the monomer, and necessarily, the molecular weight of the polymer as formed is less than the sum of the molecular weights of all the original monomer units which were combined in the reaction to form the polymer chain. Examples of $C_1$–$C_{10}$ alkyls are methyl, propyl, butyl, pentyl, etc.; examples of the $C_3$–$C_{10}$ isoalkyls are isopropyl, isobutyl, isopentyl and the like. Examples of $C_1$–$C_{10}$ alkylenes are as follows: methylene, dimethylene, trimethylene and the like; examples of $C_3$–$C_{10}$ isoalkylenes are as follows: methyltrimethylene, 2-methyltetramethylene and the like.

A variation of preparation reactions (1) and (2) is also disclosed in CHEMICAL ABSTRACT 3935K, Vol. 71 (1969) S. African Pat. No. 6,704,646.

Examples of HOR₄OH of reaction (1) are as follows: ethylene glycol, propylene glycol and trimethylene glycol. Examples of HOOCR₅COOH of reaction (3) are as follows: oxalic, malonic, succinic, glutaric, adipic, pimelic, suberic, azelaic, sebacic, undecanedioic, α,α-diethylsuccinic and α-methyl-α-ethyl suberic.

Examples of poly(dioxa-amide) polymer that can be prepared in the aforementioned generalized scheme are the following:

$$\left[-NH-(CH_2)_3-O-(CH_2)_2-O-(CH_2)_3-N-\overset{H}{\underset{}{}}\overset{O}{\underset{}{\|}}C-(CH_2)_4-\overset{O}{\underset{}{\|}}C-\right]$$

poly(4,7-dioxadecamethylene adipamide), also N-30203-6

$$\left[-NH-(CH_2)_3-O-(CH_2)_2-O-(CH_2)_3-N-\overset{H}{\underset{}{}}\overset{O}{\underset{}{\|}}C-(CH_2)_8-\overset{O}{\underset{}{\|}}C-\right]$$

poly(4,7-dioxadecamethylene sebacamide), also N-30203-10

$$\left[-NH-(CH_2)_3-O-(CH_2)_4-O-(CH_2)_3-N-\overset{H}{\underset{}{}}\overset{O}{\underset{}{\|}}C-(CH_2)_4-\overset{O}{\underset{}{\|}}C-\right]$$

poly(4,9-dioxadodecamethylene adipamide), also N-30403-6

$$\left[-NH-(CH_2)_3-O-CH_2-\overset{CH_3}{\underset{CH_3}{C}}-CH_2-O-(CH_2)_3-N-\overset{H}{\underset{}{}}\overset{O}{\underset{}{\|}}C-(CH_2)_4-\overset{O}{\underset{}{\|}}C-\right]$$

poly(4,8-dioxa-6,6-dimethylundecamethylene adipamide)

$$\left[-NH-CH_2-\overset{CH_3}{\underset{}{CH}}-CH_2-O-(CH_2)_2-O-CH_2-\overset{CH_3}{\underset{}{CH}}-CH_2-N-\overset{H}{\underset{}{}}\overset{O}{\underset{}{\|}}C-(CH_2)_4-\overset{O}{\underset{}{\|}}C-\right]$$

poly(4,7-dioxa-2,9-dimethyldodecamethylene adipamide)

$$\left[-NH-(CH_2)_3-O-(CH_2)_2-O-(CH_2)_3-N-\overset{H}{\underset{}{}}\overset{O}{\underset{}{\|}}C-CH_2-\overset{CH_3}{\underset{}{CH}}-CH_2-CH_2-\overset{O}{\underset{}{\|}}C-\right]$$

poly(4,7-dioxadecamethylene-2-methyladipamide)

The aforementioned blocks of poly(dioxa-amide) and melt spinnable polyamide having no ether linkages can contain as few as four repeating units within the polymer of present invention. Thus the aforementioned y and z both can equal 4. Data reported in the Examples show that a melt spinnable polyamide, as an illustration, having four repeating units has an estimated melting point which does not differ substantially from the melting point of its relatively high molecular weight polymer. Similar data, also reported in the Examples, for a poly(dioxa-amide), shows that 30203-6 having four repeating units has a melting point which does not differ substantially from the melting point of its relatively high molecular weight polymer. Thus each four repeating unit block, when present in a block copolymer, can retain its own particular properties without substantially degrading the properties of the other repeating unit block. To minimize loss of properties the preferred minimum values for y and z are eight and more preferred values are ten. Preferred maximum values of y and z are about 175 and 185, respectively, more preferred values are about 100 and 130 but values of 200 and 300 are operative. Values of y and z are median values.

The polymers of present invention can also contain an antioxidant such as 1,3,5-trimethyl-2,4,6-tris-(3,5-ditertiary-butyl-4-hydroxybenzyl)benzene. Small amounts of antioxidant, e.g., 0.5 weight percent, are satisfactory, however, as little as 0.01 weight percent can be used or as much as 2.0 weight percent also can be satisfactory. Antioxidants other than the aforementioned one can be used. The antioxidant generally would be mixed in combination with the two polymers prior to melt blending. Other usual additives for polyamides such as delusterants and/or light stabilizers can also be incorporated.

EXAMPLES

The following describes how the various novel polymers and their precursors were prepared, and the influence of certain variables upon their properties. Also reported are results on comparative polymers.

1. Preparation of 1,2-bis($\beta$-cyanoethoxyethane) [NC—$(CH_2)_2$O—$(CH_2)_2$—O—$(CH_2)_2$—CN]

To a 5 liter double walled (for water cooling) glass reactor with a bottom drain and stopcock was charged 930 grams (15 moles) of ethylene glycol and 45.6 grams of 40% aqueous KOH solution. Some 1620 grams (30.6 moles) of acrylonitrile (NC—CH=$CH_2$) were then added dropwise with stirring at such a rate that the temperature was kept below 35° C. After the addition was completed the mixture was stirred an additional hour and then allowed to stand overnight. The mixture was then neutralized to a pH of 7 by the addition of 6 molar HCl. After washing with saturated NaCl solution three times, the product was separated from the aqueous layer, dried over $CaCl_2$ and passed through an $Al_2O_3$ column to insure that all basic materials had been removed. The yield obtained was 90% of theoretical.

2. Preparation of 4,7-dioxadecamethylenediamine [$NH_2(CH_2)_3$—O—$(CH_2)_2$—O—$(CH_2)_3$—$NH_2$]

In an 800 milliliter hydrogenation reactor was charged 150 grams of 1,2-bis($\beta$-cyanoethoxyethane), 230 milliliters of dioxane and about 50 grams Raney Co. After purging the air, the reactor was pressurized with hydrogen up to 2000 psi and heated to 110° C. As the hydrogen was consumed additional hydrogen was added until pressure remained constant. Upon cooling, the pressure was released and the catalyst was filtered. The dioxane was removed by atmospheric distillation. The remaining mixture was distilled by a 3 foot spinning band distillation unit. The diamine distilled at 123°–214° C. and 3.75 mm Hg. About 98 grams of 99.95% pure material were obtained. The material can be referred to as 30203 diamine.

3. Preparation and Polymerization of Poly(4,7-dioxadecamethylene adipamide) (N-30203-6)

To a solution of 41.50 grams of adipic acid dissolved in a mixture of 250 milliliters of isopropanol and 50 milliliters of ethanol was added, with stirring, 50 grams of the 30203 diamine dissolved in 200 milliliters of isopropanol. An exothermic reaction occurred. Upon cooling, a polymer salt crystallized out of solution. The salt was collected on a Buchner funnel and subsequently recrystallized from a mixture of 400 milliliters of ethanol and 300 milliliters of isopropanol solution. The product, dried in vacuo overnight at 60° C., had a melting point of 128° C. and the pH of a 1% solution was 6.9. 85 Grams (92% yield of theoretical) of the salt was obtained.

About 40 grams of the polymer salt were charged to a heavy walled glass polymer "D" tube. Then the neck of the tube was constricted for sealing and purged of air by evacuating and filling with nitrogen five times. Finally the tube was heated in an aluminum block for 2 hours at 200° C. After cooling the tip of the tube was broken off and the remaining portion was bent over at a 45° angle by heating and then connected to a manifold and purged of air with nitrogen vacuum cycles. The tubes were heated at 222° C. under nitrogen at atmospheric pressure for 6 hours using methyl salicylate vapor baths. On cooling, the tubes were broken and the polymer plug cut to ⅛ inch size pieces. The resulting polymers had inherent viscosities ranging from 0.9 to 1.1 in a meta-cresol solution.

4. Polymer Melt Blending

Suitable amounts of dried N-30203-6 and nylon-6 were charged to a large test tube having two openings in the rubber stopper. The openings were for a helical stirrer and a nitrogen inlet. The container was purged of air. Afterwards the nitrogen-filled container was heated using a suitable liquid-vapor bath. The mixture of the two polymers was agitated with the helical stirrer powered by an air motor for the required time. Before allowing the molten polymer to cool the stirrer was lifted to drain the polymer. After solidification the material was broken up and dried for spinning.

5. Polymer Spinning and Drawing

After the aforementioned melt blending the polymer was charged to a micro spinning apparatus consisting of stainless steel tube (⅝" OD × 12") with a 0.037" capillary. The tube was heated with a vapor bath to the temperature consistent with the polymer. Generally about 245° C. was used. Nitrogen was swept through the polymer until the polymer melted and sealed the capillary. After the polymer was completely melted and a uniform temperature had been reached (about 30 minutes) the nitrogen pressure was increased by about 30–50 psig (depending on the polymer melt viscosity) to extrude the polymer.

Due to the nature of this apparatus, it could not be equipped with a filter system to remove particles from polymer melt. This made spinning polymers that were prone to form gel particles such as nylon-6,6 difficult to spin continuously.

The fiber as it left the tube was drawn on a series of rollers and wound up on a bobbin. The first roller or feed roll was traveling at 35 ft/min. The filament was wrapped five times around this. After crossing a hot pipe maintained at about 50° C. the filament was wrapped around the second roller or a draw roll (five times) which speed varied depending on the draw ratio required (130–175 ft/min). Unlike commercial draw rolls, the fiber tended to abrade itself; that is the fiber coming off rubbed against fiber coming on. This made higher draw ratios difficult to obtain. The third roll had a removable bobbin and was driven at a slightly lower speed than the draw roller.

Draw ratio refers to the ratio of the speed of the second roller or draw roll to the speed of the first roller or feed roll. Thus if the second roller was traveling at 175 ft/min and the first roller at 35 ft/min the draw ratio is five (175/35). This difference in speeds of the rollers stretches the fiber. Stretching or drawing orientates the molecules, i.e., places them in a single plane running in the same direction as the fiber.

6. Results of Tests and Comparative Runs

The accompanying Table I shows the effect of melt blending's temperature and time on various properties of block copolymers having different proportions of poly(dioxa-amide) and polyamide. Also shown are comparative results.

Comparision of Runs 1, 3 and 5 indicate that at relatively low temperatures and short blending time the addition of substantial amounts of N-30203-6 into nylon-6 does not substantially lower the melting point of the resulting N-30203-6//6. Decreases in tenacity and initial modules are noted while an increase in elongation exists.

Comparison of Runs 5, 6 and 7 indicates that as the blending time at a constant temperature increases a decrease in melting point occurs. This indicates a decrease in the amount and size of "blocks" and further indicates an increase in the amount of "randomness".

Indirectly it is known that crystallinity of a block copolymer falls off as the alternating sequences increase. Thus properties dependent on crystallinity such as melting point and tenacity decrease as alternating increases.

The fact that inherent viscosity, a measurement indicating molecular weight, increases means that the molecular weight is increasing thereby eliminating degradation as a reason for the change in melting point. The increase in blending time also causes a reduction in tenacity, elongation and initial modulus.

Comparison of Runs 7, 8 and 9 indicates that while maintaining a constant blending time, as the temperature of blending increases, decreases occur in inherent viscosity and melting point. Also decreases in tenacity and initial modulus occur.

Tenacity, elongation (elongation to rupture) and initial modulus (textile modulus) and the methods for obtaining such values are defined and described in Kirk-Othmer, ENCYCLOPEDIA OF CHEMICAL TECHNOLOGY, 2nd ed., Vol. 20, Textile Testing.

Accompanying Table II shows the moisture regain of several block copolymers having different proportions of poly(dioxa-amide) and polyamide. Also shown are comparative results for nylon-6 and cotton.

Comparison of Runs 1–6 (Table II) demonstrates that increasing the amount of poly(dioxa-amide) in the block copolymer increases moisture regain substantially compared to the moisture regain of nylon-6 at various relative humidities. Also comparison of Runs 7 and 6 indicates that said block copolymer containing 30% N-30203-6 has a moisture regain better than cotton at 95% and 85% relative humidities and almost equal at lower levels of 65% and 75% relative humidities.

Moisture regain refers to the amount of moisture a dried sample of fiber picks up in a constant relative humidity atmosphere. Measurement of this property was carried out using a series of humidity chambers made from dessicators containing suitable saturated salt solutions (i.e., $NaNO_2$ = 65%; $NaCl$ = 75%, $KCl$ = 85% and $N_2SO_3$ = 95%) at room temperature.

To determine moisture regain first a sample of the fiber was dried in a vacuum dessicator over $P_2O_5$. After a constant weight was obtained the sample was placed in one of the appropriate chambers. The chamber was then evacuated to speed up equilibrium. The fiber remained in the chamber until a constant weight was obtained. The increase in weight of the sample over the dried sample was the amount of moisture regained.

Accompanying Table III shows the effect of boil off on moisture regain of several block copolymers prepared at different blending temperatures and times. Also shown are weight losses which occurred during boill off. Comparative data for nylon-6 is also reported.

Boil off refers to the placement of the fiber in boiling water for a specified length of time. Afterwards the weight loss was determined. Also after following the procedure described for determining moisture regain the incremental increase in percent moisture regain at 65% relative humidity was determined. Boil off can be considered as akin to a dye treatment.

The increase in moisture regain as a result of boil off is thought to best be understood by the following explanation. By placing the fiber in boiling water portions of the fiber relax. Thus the orientated amorphous sections tend to open up. Boiling off speeds up the relaxation of this unnatural state. This opening up permits the fiber to take up more moisture that it otherwise would be capable of. Heating the fiber, by other than placing in boiling water, will also relax the fiber. Weight loss comparisons of Runs 3, 2 and 1 indicate again that as blending time is increased the polymer becomes more random.

Accompanying Table IV demonstrates the effect of various draw ratios in moisture regain, tenacity, elongation and initial modulus of several block copolymers of poly(dioxa-amide) and polyamide.

The data indicates that as draw ratios were increased generally moisture regain decreased except at a 95% relative humidity. Also as the draw ratios were increased tenacity and initial modulus increased but elongation decreased.

Accompanying Table V shows the effect of percent of N-30203-6 in 30203-6//6 on dye uptake. The data indicates that as the percent of N-30203-6 in N-30203-6//6 increase dye uptake increases. Compared to water molecules, dyes are larger molecules and cannot penetrate the crystalline structure of nylon fiber, thus dye uptake can be related to the amount of amorphous regions in the fiber.

The amount of dye uptake was measured in the following manner. The preweighed fibers were dyed in suitable containers at room temperature. The concentration of the "direct" yellow 28" in the aqueous dye solution was measured before and after spectrophotometrically. The dyeing was considered complete when no decrease in dye concentration was observed over several hours. Prior to dyeing it was determined that the initial concentration of the dye in the bath had to be greater than $5.8 \times 10^{-5}$ grams per milliliter so that the measured dye absorption was independent on the initial dye concentration.

Accompanying Table VI describes the relative oxidation degradation of a block copolymer of poly(dioxa-amide) and polyamide. The data indicates that the copolymer N-30203-6//6 suffers tenacity losses when exposed to air at elevated temperatures; comparison of Runs 4, 5 and 6. However, the data also indicates that a small amount of antioxidant, e.g., 1,3,5-trimethyl-2,4,6-tris-(3,5-ditertiary-butyl-4-hydroxybenzyl)benzene, at least prevents tenacity losses and perhaps even increased tenacity; comparison of Runs 8 and 5, 9 and 6. Also shown is the relative stability of nylon-6; the increase in tenacity of nylon-6 in comparative Run 2 is believed to be the result of annealing.

Surprisingly in Run 5, although a tenacity loss was sustained, virtually no discoloration occurred.

In Runs 7, 8 and 9 the aforementioned antioxidant was added in the amount of 0.5 weight percent prior to melt blending.

The data of Table VI was obtained in the following manner. The fibers listed in the table were placed in a forced air oven maintained at 120° C. for the listed times. After sufficient time had passed, samples were removed and tested for changes in tenacity.

7. Minimum Value for Repeating Units

To determine how few repeating units, i.e., y and z, could be contained within a block and still retain its polymeric properties the data shown in the accompanying Tables VII and VIII were obtained. To obtain the data five samples of nylon 30203-6 salt were polymerized at various conditions as shown in Table VII and subsequently average molecular weights and melting points were determined. These results are reported in Table VII. Dividing the measured average molecular weight by the molecular weight of the repeat unit in the polymer, which is 286, the average value of y is computed. This value is also reported in Table VII. Also shown is the melting point of the N-30203-6 salt monomer. Also, three samples of caprolactam were polymerized at various conditions as shown in Table VIII and subsequently average molecular weights and melting points were determined. The foregoing two tests were also run on one sample of a purchased polymer. Average values of z were calculated in a similar manner as y. Also shown is the melting point of the caprolactam monomer. Also shown in Table VIII is an estimated value for z. This estimtaed value is based on an extrapolation of Runs 1-3 via semi-log graph paper.

For both of the foregoing blocks the relatively small decrease in melting point compared to the substantial decrease in number of repeat units, i.e., y and z, indicates that four repeating units can be contained in a block without adversely changing the properties of the block.

8. Others

Analogous results are obtained when nylon-6,10; nylon-11; MXD-6; PACM-12 and others are used in place of nylon-6 in the polymer melt blending step (4). Also, analogous results are obtained when in step (3), adipic acid is replaced with one of the following acids: oxalic, malonic, succinic, glutaric, pimelic, suberic, azelaic, sebacic, undecanedioic, $\alpha,\beta$-diethylsuccinic and $\alpha$-methyl-$\alpha$-ethylsuberic. When the ethylene glycol of step (1) is replaced with one of the following glycols: trimethylene, propylene and tetramethylene analogous results are obtained.

9. Comparative Data

Accompanying Table IX compares moisture retention of applicant's N-30203-6//6 with N-30203-6, N-30203-6/6 and a composite fiber of N-30203-6/6 and nylon 6. The moisture retention procedure is described in a footnote in the Table.

Comparison of fibers of block copolymers 7 and 8 with the other fibers indicates their superiority as to moisture retention.

TABLE I

EFFECT OF MELT BLENDING ON PROPERTIES OF BLOCK COPOLYMER OF POLY (DIOXA-AMIDE) POLYAMIDE (N-30203-6//6

| Run | Polymer | Percent of 30203-6 | Blending Temp. °C | Blending Minutes | Inherent Viscosity[c] | Melting Point °C[c] | Tenacity[b]* | Elongation %[b] | Initial[b] Modulus* |
|---|---|---|---|---|---|---|---|---|---|
| 1 | nylon-6 | 0 | NA | NA | 1.10 | 219 | 3.7 | 45 | 11.5 |
| 2 | N-30203-6 | 100 | NA | NA | 0.89 | 182 | — | — | — |
| 3 | N-30203-6//6 | 10 | 282 | 15 | 1.15 | 219 | 2.6 | 43 | 12.0 |
| 4 | " | 10 | 282 | 180 | 1.18 | 215 | 3.5 | 60 | 12.0 |
| 5 | " | 20 | 282 | 15 | 1.03 | 218 | 2.9 | 68 | 9.0 |
| 6 | " | 20 | 282 | 180 | 1.04 | 213 | 3.0 | 66 | 8.0 |
| 7 | " | 20 | 282 | 360 | 1.10 | 205 | 2.3 | 59 | 7.0 |
| 8 | " | 20 | 295 | 360 | 0.73 | 195 | 1.9 | 59 | 7.0 |
| 9 | " | 20 | 305 | 360 | 0.68 | 193 | 1.4 | 64 | 5.5 |
| 10 | " | 25 | 295 | 30 | 1.05 | 214 | 2.2 | 64 | 6.3 |
| 11 | " | 30 | 295 | 30 | 1.03 | 220[a] | 2.1 | 65 | 7.2 |

[a]Believed not to be representative sample.
[b]Draw ratio 3.7 ambient RH, but no significant differences observed at various RH; 40 monofilaments twisted together average of 7 or 8 samples per test.
[c]Fiber
*Units are grams/denier.
NA = Not Applicable

TABLE II

MOISTURE REGAIN OF BLOCK COPOLYMER OF POLYAMIDE AND POLY(DIOXA AMIDE) (N-30203-6//6, MONOFILAMENT, AFTER BOIL OFF)

| Run | Material | Percent of 30203-6 in Material | Moisture Regain 95% RH[b] | 85% RH[b] | 75% RH[b] | 65% RH[b] |
|---|---|---|---|---|---|---|
| 1 | nylon-6 | 0 | 7.6 | 5.8 | 4.5 | 4.1 |
| 2 | N-30203-6//6[a] | 10 | 10.0 | 7.4 | 5.9 | 4.5 |
| 3 | " | 15 | 11.7 | 8.2 | 6.3 | 4.4 |
| 4 | " | 20 | 12.2 | 9.2 | 7.2 | 5.2 |
| 5 | " | 25 | 13.0 | 10.0 | 7.3 | 5.4 |
| 6 | " | 30 | 15.5 | 12.1 | 8.6 | 6.0 |
| 7 | cotton | 0 | 14.5 | 11.8 | 9.5 | 7.6 |

[a]Melt blended at 295° C for 30 minutes, draw ratio 3.7
[b]% RH = percent relative humidity.

TABLE III

EFFECT OF BOIL OFF ON MOISTURE REGAIN OF BLOCK COPOLYMER OF POLY(DIOXA-AMIDE) AND POLYAMIDE

| Run | Material | Percent of 30203-6 in Material | Blending Conditions Temp, °C | Time, Minutes | Weight Loss[a] % | Incremental Increase in % Moisture Regain at 65% RH |
|---|---|---|---|---|---|---|
| 1 | nylon-6 | NA | NA | NA | 1.4 | 0.5 |
| 2 | N-30203-6//6 | 20 | 282 | 360 | 1.8 | 0.7 |
| 3 | " | 20 | 282 | 15 | 3.9 | — |
| 4 | " | 20 | 295 | 60 | 3.3 | — |
| 5 | " | 20 | 295 | 30 | 3.4 | — |
| 6 | " | 20 | 295 | 15 | 3.4 | — |
| 7 | " | 25 | 295 | 60 | — | 1.8 |

[a] $\frac{\text{Weight Before} - \text{Weight After Placed in Boiling Water for 15 minutes}}{\text{Weight Before}}$ NA = not applicable

TABLE IV

EFFECT ON DRAW RATIO ON PROPERTIES OF BLOCK COPOLYMER OF POLY(DIOXA-AMIDE) POLYAMIDE (N-30203-6//6)

| Run | % 30203-6 in N-30203-6//6[e] | Draw Ratio[a] | Moisture Regain[c] 95% RH | 85% RH | 75% RH | 65% RH[b] | Tenacity[d]* | Elongation %[d] | Initial Modulus[d]* |
|---|---|---|---|---|---|---|---|---|---|
| 1 | 25 | 3.7 | 13.0 | 10.0 | 7.3 | 5.4 | 2.2 | 64 | 6.3 |
| 2 | 25 | 4.5 | 14.2 | 10.1 | 7.4 | 5.2 | 2.8 | 40 | 13.0 |
| 3 | 25 | 5.0 | — | — | — | — | 2.9 | 24 | 15.0 |
| 4 | 30 | 3.7 | 15.5 | 11.7 | 9.6 | 6.0 | 2.1 | 65 | 7.2 |
| 5 | 30 | 4.5 | 14.0 | 11.8 | 7.8 | 5.7 | 2.8 | 59 | 8.6 |
| 6 | 30 | 5.0 | — | — | — | — | 3.7 | 52 | 16.2 |

[a] Ratio of speed of second roller to speed of first roller.
[b] % RH = percent relative humidity.
[c] Monofilament
[d] 40 monofilaments twisted together; average of 7 or 8 samples per test.
[e] Blending is 295° C and 30 minutes.
*Units are grams/denier.

TABLE V

EFFECT OF PERCENT OF POLY(DIOXA AMIDE) IN BLOCK COPOLYMER ON DYE UPTAKE[a]

| Run | Percent of 30203-6 in N-30203-6//6[b] | Dye Absorption moles/gram of fiber × 10² |
|---|---|---|
| 1 | 0 | 1.00 |
| 2 | 10 | 1.65 |
| 3 | 15 | 1.90 |
| 4 | 20 | 2.15 |
| 5 | 30 | 2.70 |

[a] Direct Yellow 28, 6 × 10⁻⁵ grams/milliliter.
[b] Melt blending 30 minutes at 295° C, draw ratio 3.7.

TABLE VI

RELATIVE OXIDATION DEGRADATION OF BLOCK COPOLYMER OF POLY(DIOXA-AMIDE) AND POLYAMIDE (N-30203-6//6-TWISTED FILAMENTS)

| Run | Material[d] | Time at 120° C[e] | Percent of Original Tenacity Retained[a] |
|---|---|---|---|
| 1 | nylon-6 | 0 | — |
| 2 | nylon-6 | 1 | 108 |
| 3 | nylon-6 | 2 | 98 |
| 4 | N-30203-6//6[b] | 0 | — |
| 5 | N-30203-6//6[b] | 1 | 87 |
| 6 | N-30203-6//6[b] | 2 | 70 |
| 7 | antioxidant[c] & N-30203-6//6[b] | 0 | — |
| 8 | " | 1 | 101 |
| 9 | " | 2 | 108 |

[a] Untreated material has base tenacity of 100; thus a value >100 means an increase; <100 means a decrease.
[b] Ratio of 30203-6 to 6 is 30/70.
[c] 0.5% ethyl antioxidant 330 added prior to melt blending.
[d] Melt blending 30 minutes at 295° C; draw ratio 3.7.
[e] Hours.

TABLE VII

MOLECULAR WEIGHT OF N-30203-6 VS. ITS MELTING POINT

| Run | Conditions | Resultant Polymer (30203-6 Salt) Average Molecular Weight[a] | Value of y[b] | Melting Point °C[c] |
|---|---|---|---|---|
| 1 | 9.5 hrs at 208–232° C & 250 psi, then 3 hrs at 232° C and atm. press. | 25,000 | 87 | 167 |
| 2 | 9.5 hrs at 208–232° C, 250 psi | 12,987 | 45 | 167 |
| 3 | 40 minutes at 240° C | 3,247 | 11.4 | 161 |
| 4 | 90 minutes at 190° C | 2,088 | 7.3 | 159 |
| 5 | 50 minutes at 190° C | 1,091 | 3.8 | 158 |
| 6 | 30203-6 salt monomer | 286 (+18 for H₂O) | 1 | 125[d] |

[a] Molecular weight is based on amino ends.
[b] Average molecular weight divided by 286 which is molecular weight of 30203-6 repeat unit.
[c] Melting point determined by Differential Scanning Colorimeter; onset value.
[d] Relatively high melting point is caused by high degree of association caused by positive and negative charges contained within the salt.

TABLE VIII

MOLECULAR WEIGHT OF NYLON-6 VS. ITS MELTING POINT

| Run | Conditions | Resultant Polymer (Caprolactam) Average Molecular Weight[a] | Value of z[b] | Melting Point °C[c] |
|---|---|---|---|---|
| 1 | Purchased | 23,809 | 211 | 209 |
| 2 | 3 hrs at 250° C and 1 ml H₂O | 7,874 | 70 | 205 |
| 3 | 3 hrs at 250° C and 4 ml H₂O | 6,211 | 55 | 201 |
| 4 | 2 hrs at 250° C | 2,024 | 18 | 188 |

TABLE VIII-continued
MOLECULAR WEIGHT OF NYLON-6 VS. ITS MELTING POINT

| | | Resultant Polymer (Caprolactam) | | |
|---|---|---|---|---|
| Run | Conditions | Average Molecular Weight[a] | Value of z[b] | Melting Point °C[c] |
| 5 | monomer (caprolactam) | 113 | 1 | 70 |

[a]Molecular weight is based on amino ends.
[b]Average molecular weight divided by 113 which is molecular weight of nylon's monomer, i.e., caprolactam.
[c]Melting point determined by Differential Scanning Colorimeter; onset value.

TABLE IX
COMPARISON OF FIBERS CONSISTING OF VARIOUS POLYMERS

| Product No. | Fiber Monocomponent or Bicomponent | Composition of Fiber | % of N-30203-6 in Overall Composition | Moisture Retention[c] 6500 rpm[d] | 8400 rpm[d] |
|---|---|---|---|---|---|
| 1 | mono | N-30203-6 | NA | Degrades during test[e] | |
| 2 | mono | Nylon-6 | NA | 12, 11.3 | 10, 10.4 |
| 3 | bi | N-30203-6/6[a] | 5 | 16 | 13 |
| 4 | bi | N-30203-6/6[a] | 20 | Degrades during test[e] | |
| 5 | bi | N-30203-6/6[a] | 25 | Degrades during test[e] | |
| 6 | bi | N-30203-6/6[a] | 30 | Degrades during test[e] | |
| 7 | mono | N-30203-6//6[b] | 30 | 27.8 | 27.1 |
| 8 | mono | N-30203-6//6[b] | 30 | 28 | 28.1 |

[a]Fiber is side by side bicomponent, i.e., $^xZ_4-Z_y$; wherein N-30203-6 is X and nylon-6 is Y. Also N-30203-6/6 is random copolymer.
[b]Applicant's fiber is block copolymer; each composition was formed at different blend conditions, product No. 9 at 283° C for 30 minutes; product No. 10 at 283° C for 45 minutes.
[c]L.A. Welow, H.M.I. Zufle, A.U. McDonald, Textile Research Journal, Vol. 22, page 261, 1952. Moisture retention is determined by placing sample in boiling water for 5 minutes, then removing and placing in room temperature water and allowing it to stand overnight. Removed from the water and centrifuged at 6500 rpm or 8400 rpm for 20 minutes to remove surface water; then weighed and dried overnight at 80° C and then reweighed. The difference in weight is amount of water retained.
[d]Speeds used in the centrifuge to remove surface water.
[e]Degrading means that fiber dissolves or plasticizes in water to form a melt or the fiber becomes very tacky.

The invention claimed is:

1. A block copolymer of poly(dioxa-amide) and polyamide having a molecular weight of about 5000–100,000 and the following repeating structural formula:

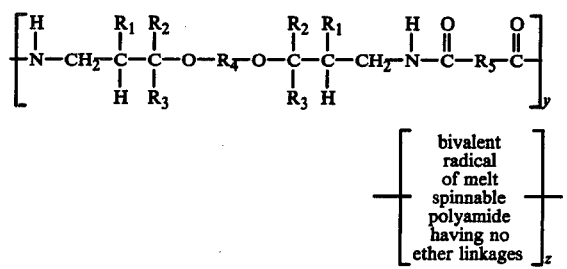

wherein
R$_1$, R$_2$ and R$_3$ are selected from the group consisting of H, C$_1$–C$_{10}$ alkyls and C$_3$–C$_{10}$ isoalkyls;
R$_4$ is selected from the group consisting of C$_1$–C$_{10}$ alkylenes and C$_3$–C$_{10}$ isoalkylenes;
R$_5$ is selected from the group consisting of C$_0$–C$_{10}$ alkylenes and C$_3$–C$_{10}$ isoalkylenes;
and y = 4–200, z = 4–200.

2. A copolymer according to claim 1 wherein the copolymer is hydrophilic.

3. A copolymer according to claim 2 wherein the copolymer has a percent moisture regain of at least 4% at a relative humidity of 65%.

4. A copolymer according to claim 1 wherein the bivalent radical polyamide is selected from the group consisting of nylon-6 and PACM-12.

5. A copolymer according to claim 4 wherein the copolymer is hydrophilic.

6. A copolymer according to claim 5 wherein the copolymer has a percent moisture regain of at least 4% at a relative humidity of 65%.

7. A copolymer according to claim 6 wherein R$_1$, R$_2$ and R$_3$ are H, and R$_4$ and R$_5$ are C$_1$–C$_{10}$ alkylenes.

8. A copolymer according to claim 7 wherein R$_4$ is a C$_2$ alkylene and R$_5$ is a C$_4$ alkylene.

9. A fiber obtained by spinning the copolymer of claim 1.

10. A fiber obtained by spinning the copolymer of claim 7.

11. A fiber obtained by spinning the copolymer of claim 8.

12. A fiber obtained by melt spinning the copolymer of claim 1.

13. A fiber obtained by melt spinning the copolymer of claim 7.

14. A fiber obtained by melt spinning the copolymer of claim 8.

15. A monofilament obtained by extrusion of the copolymer of claim 1.

16. A monofilament obtained by extrusion of the copolymer of claim 7.

17. A monofilament obtained by extrusion of the copolymer of claim 8.

18. A yarn obtained by twisting fibers of the copolymer of claim 1.

19. A yarn obtained by twisting fibers of the copolymer of claim 7.

20. A yarn obtained by twisting fibers of the copolymer of claim 8.

21. A fabric obtained by weaving yarn of the copolymer of claim 1.

22. A fabric obtained by weaving yarn of the copolymer of claim 7.

23. A fabric obtained by weaving yarn of the copolymer of claim 8.

24. A fabric obtained by knitting yarn of the copolymer of claim 1.

25. A fabric obtained by knitting yarn of the copolymer of claim 7.

26. A fabric obtained by knitting yarn of the copolymer of claim 8.

27. A fabric obtained by knitting monofilament of the copolymer of claim 1.

28. A fabric obtained by knitting monofilament of the copolymer of claim 7.

29. A fabric obtained by knitting monofilament of the copolymer of claim 8.
30. A nonwoven fabric obtained by laminating the copolymer of claim 1.
31. A nonwoven fabric obtained by laminating the copolymer of claim 7.
32. A nonwoven fabric obtained by laminating the copolymer of claim 8.
33. A fiber comprising the copolymer of claim 1.
34. A fiber comprising the copolymer of claim 7.
35. A fiber comprising the copolymer of claim 8.
36. A monofilament comprising the copolymer of claim 1.
37. A monofilament comprising the copolymer of claim 7.
38. A monofilament comprising the copolymer of claim 8.
39. A yarn comprising the copolymer of claim 1.
40. A yarn comprising the copolymer of claim 7.
41. A yarn comprising the copolymer of claim 8.
42. A fabric comprising the copolymer of claim 1.
43. A fabric comprising the copolymer of claim 7.
44. A fabric comprising the copolymer of claim 8.
45. A nonwoven fabric comprising the copolymer of claim 1.
46. A nonwoven fabric comprising the copolymer of claim 7.
47. A nonwoven fabric comprising the copolymer of claim 8.

* * * * *